United States Patent
Henderson

[15] 3,704,764
[45] Dec. 5, 1972

[54] AIR DELIVERABLE SEISMIC SYSTEM
[72] Inventor: Harold B. Henderson, Garland, Tex.
[73] Assignee: Texas Instruments Incorporated, Dallas, Tex.
[22] Filed: Dec. 23, 1969
[21] Appl. No.: 887,555

[52] U.S. Cl......181/.5 VM, 181/.5 AP, 340/15.5 TS, 340/17
[51] Int. Cl..............................................G01v 1/16
[58] Field of Search...............181/.5 AP, .5 P, .5 JM; 340/15.5 TS, 17; 325/112, 113; 273/102.1, 102.2; 324/4; 250/203

[56] References Cited

UNITED STATES PATENTS

| | | | |
|---|---|---|---|
| 3,509,960 | 5/1970 | Hamilton | 181/.5 JM |
| 3,504,869 | 4/1970 | Evans et al. | 244/3.16 |
| 3,237,151 | 2/1966 | Thorpe | 181/.5 VM |
| 2,683,867 | 7/1954 | Vann | 340/15.5 TS |
| 3,246,291 | 4/1966 | Lehner et al. | 340/17 |
| 3,054,085 | 9/1962 | Alexander | 340/17 |

OTHER PUBLICATIONS

"Sun Sensor Orient Space Craft," 3/4/60, Pg. 62,64 Electronics Research and Development

*Primary Examiner*—Benjamin A. Borchelt
*Assistant Examiner*—N. Moskowitz
*Attorney*—Samuel M. Mims, Jr., James O. Dixon, Andrew M. Hassell, Rene E. Grossman, Mel Sharp and John Vandigriff

[57] ABSTRACT

An aerial delivery system includes a cylindrical container having blunt ends. One portion of the container houses an antenna and a seismic sensor. Another portion houses a pair of stabilizing feet and a motor for rotating the portions of the container relative to each other. In use, the container is dropped from an airplane, etc. Upon landing, the feet are extended and the orientation of the container is determined. Then, the one portion of the container is rotated until the antenna and the sensor are vertical. Finally, the antenna and the sensor are deployed.

13 Claims, 7 Drawing Figures

PATENTED DEC 5 1972 3,704,764

INVENTOR:
HAROLD B. HENDERSON

René E. Grossman

ATTORNEY

INVENTOR:
HAROLD B. HENDERSON

ATTORNEY

INVENTOR
HAROLD B. HENDERSON

ATTORNEY

AIR DELIVERABLE SEISMIC SYSTEM

Seismic systems for use in remote locations typically include a data gathering sensor and a data transmitting antenna. In the use of such a system, it is necessary to position the sensor in contact with the earth and to position the antenna at least generally vertically. In many instances, it is also necessary to deliver such a system to a data gathering location by dropping it from an airplane.

Heretofore, aerial delivery systems for seismic systems and the like have usually comprised a bomb-like package having a pointed nose and stabilizing fins. When such a package is dropped from an airplane, the fins orient the package vertically. Upon landing, the nose penetrates the earth so that the package remains in a vertical orientation.

When such an aerial delivery system is used to deliver a seismic system, the data gathering sensor of the system is mounted in the nose of the package. The data transmitting antenna is mounted in the rear of the package and is deployed after landing. Thus, if the package enters the earth vertically, the sensor is positioned in contact with the earth and the antenna extends vertically.

Aerial delivery systems comprising finned packages perform adequately in open terrain. In forested areas, however, the performance of such a system is often less than satisfactory. For example, the fins of the package frequently become entangled in tree limbs so that the package does not fall to the ground. If the package passes through a tree without becoming tangled, it is usually slowed or deflected to such an extent that it does not properly enter the earth.

This invention relates to an aerial delivery system that operates in forested areas as well as in open terrain. In accordance with the preferred embodiment of the invention, a container is dropped to the ground in a random manner. When the container is on the ground, its orientation is sensed. Then, at least a portion of the container is aligned with a predetermined direction. Preferably, at least one data recovery instrumentality is thereafter deployed from the aligned portion of the container.

A more complete understanding of the invention may be had by referring to the following detailed description when taken in conjunction with the drawings, wherein.

Figure 1:
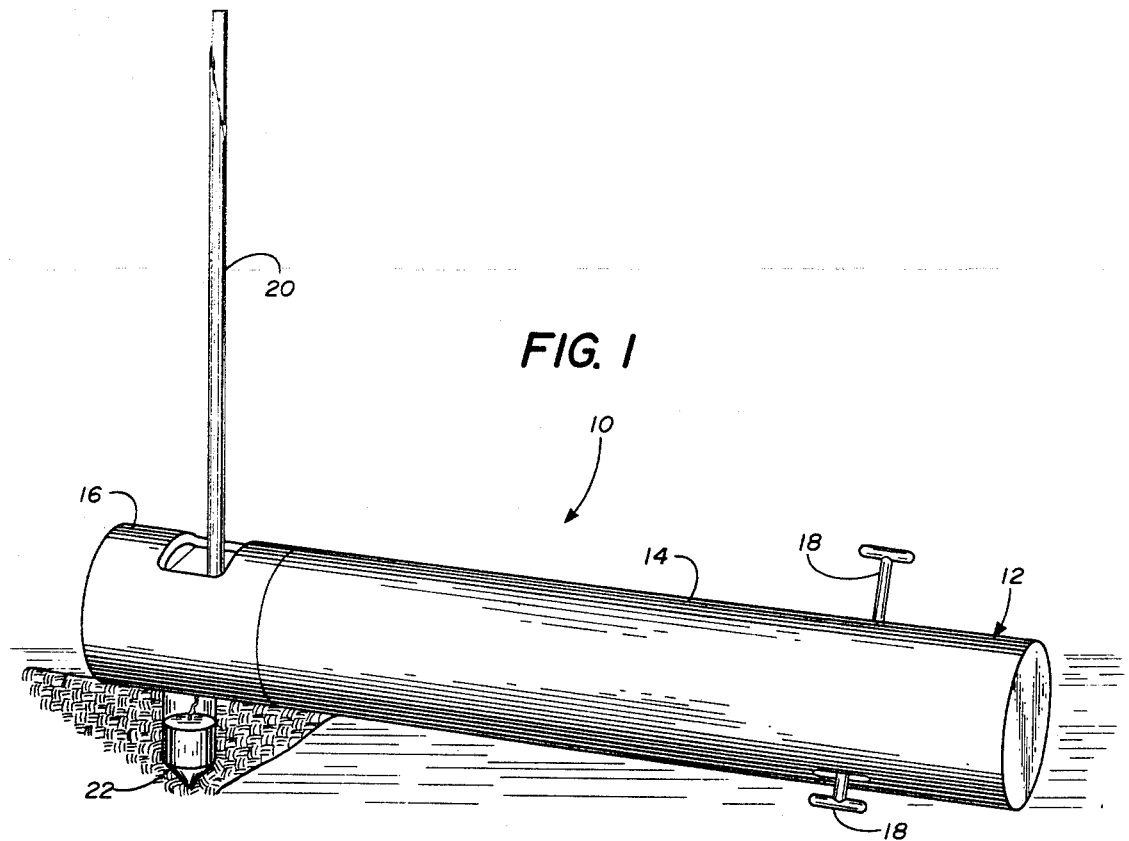
FIG. 1 is a perspective view of an aerial delivery system employing the invention.

Referring now to the drawings, and particularly to FIG. 1, there is shown an aerial delivery system 10 employing the invention. The system 10 includes a delivery package or container 12 comprising a first or main housing 14 and a second or antenna and sensor housing 16. The package 12 comprises a right circular cylinder and has blunt ends.

In use, the aerial delivery system 10 is deployed from an aircraft such as an airplane, a helicopter, etc. Upon landing, the system 10 assumes the orientation shown in FIG. 1 wherein the axis of the container 12 extends parallel to the surface of the earth. This orientation is generally assured by two physical phenomena. First, when a cylinder falls through the atmosphere, it orients its axis parallel to the earth and perpendicular to the air stream. Second, the orientation shown is the lowest potential energy configuration and thus the most stable orientation of such an elongated right circular cylinder relative to the earth.

When the system 10 has come to rest, a pair of stabilizing feet 18 are deployed from the main housing 14 of the container 12 and the orientation of the system 10 relative to the gravitational field of the earth is sensed. Then, the antenna and sensor housing 16 is rotated relative to the main housing 14 until it is orientated in a particular direction relative to vertical. Finally, an antenna 20 and a sensor 22 are deployed from the housing 16. Thereafter, data is gathered through the sensor 22 and is transmitted through the antenna 20 by means of seismometer and transmitter circuitry contained within the package 12.

Figure 2:
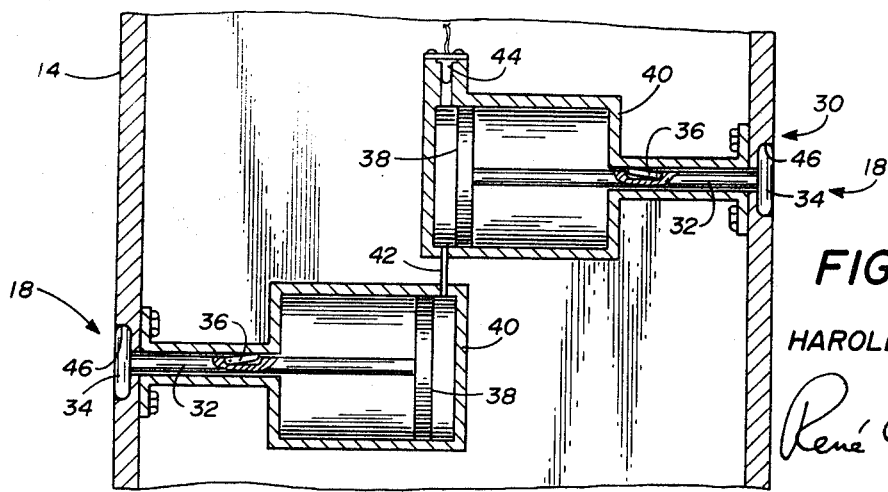
FIG. 2 is a sectional view of a stabilizing feet actuating system employed in the system shown in FIG. 1.

Referring now to FIG. 2, a system 30 that extends the stabilizing feet 18 of the system 10 is shown. The feet 18 each include a rod 32 and a T-bar 34 fixed to one end of the rod. Each rod 32 contains a spring loaded latch 36 and extends to a piston 38.

The feet 18 are each mounted in a cylinder 40. The blind ends of the cylinders 40 are interconnected by a tube 42. An electrically operated gas generating squib 44 is mounted in a blind end of one of the cylinders.

During deployment of the aerial delivery system 10, the feet 18 are positioned as shown in FIG. 2, wherein the pistons 38 are positioned adjacent the blind ends of the cylinders 40 and the T-bars 34 are positioned in cavities 46 formed in the main housing 14 of the package 12. The feet are retained in the retracted position by frictional engagement of the pistons 38 with the cylinders 40. When the system 10 has come to rest, the squib 44 is fired. Upon actuation, the squib 44 fills the blind ends of the cylinders 40 with a gas which applies pressure to the pistons 38. This forces the feet 18 outwardly until the latches 36 clear the rod ends of the cylinders 40. Once clear, the latches snap into engagement with the housing 14 and thereafter prevent inward movement of the feet 18 relative to the housing 14.

Figure 3:
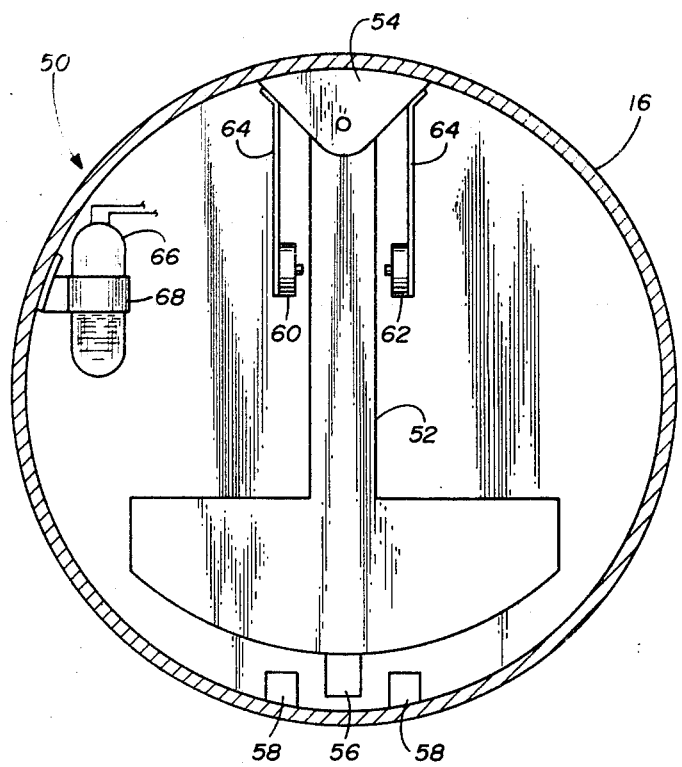
FIG. 3 is a sectional view of an orientation determining system employed in the system shown in FIG. 1.

The orientation of the aerial delivery system 10 relative to the gravitational field of the earth is determined by an orientation determining system, such as the system 50 shown in FIG. 3. A pendulum 52 is pivotally supported on a bracket 54 that is fixed to the antenna and sensor housing 16 of the system 10. A peg 56 extends from the distal end of the pendulum 52 for cooperation with a pair of stops 58 to limit the pivotal movement of the pendulum. A pair of switches 60 and 62 are mounted adjacent the pendulum 52 on a pair of brackets 64 that extend from the bracket 54.

If the pendulum 52 is oriented other than vertically, it engages either the switch 60 or the switch 62. The engaged switch thereupon produces an output indicative of the direction that the housing 16 must be rotated in order to orientate the pendulum 52 vertically. The system 50 further includes a mercury switch 66 which is secured to the housing 16 by a bracket 68. The switch 66 produces an output if the pendulum 52 is orientated upside down.

Figure 4:
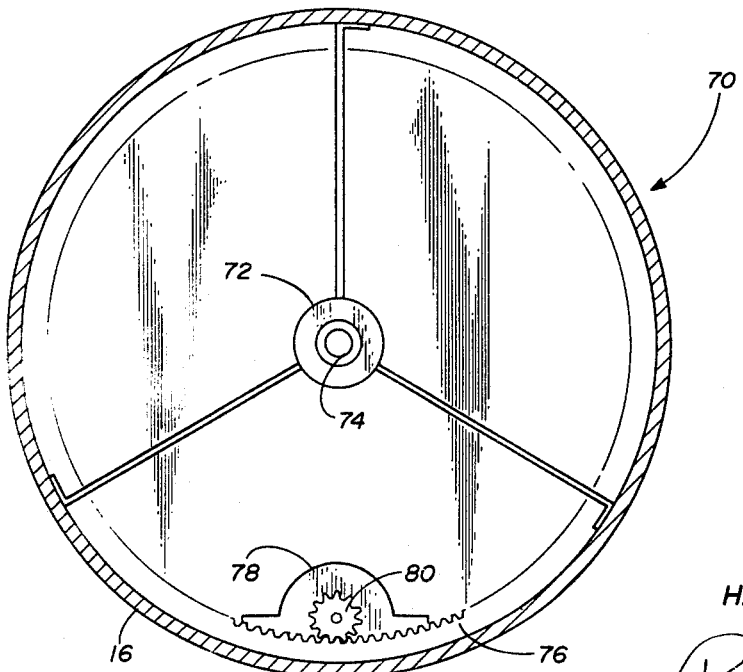
FIG. 4 is a sectional view of an orientation changing system employed in the system shown in FIG. 1.

Referring now to FIG. 4, an orientation correcting system 70 that operates under control of the orientation determining system 50 is shown. The antenna and sensor housing 16 of the container 12 is mounted on a pair of bearings 72 (only one of which is shown) which are in turn mounted on a tube 74. The tube 74 is secured to the housing 14 of the system 10 and accordingly, the housing 16 is mounted for rotation relative to the housing 14. A ring gear 76 is mounted around the periphery of the housing 16 for rotation therewith.

The system 70 further includes a motor 78 which is mounted on the housing 14 for operation under control of the switches 60, 62 and 66 of the system 50. The motor 78 drives a gear 80 mounted in mesh with the ring gear 76. Whenever one of the switches of the system 50 is actuated, the motor 78 rotates the housing 16 relative to the housing 14 until the pendulum 52 of the system 50 is vertical.

Figure 5:
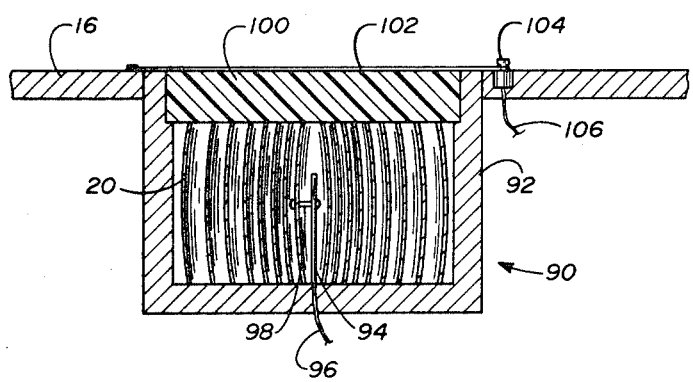
FIG. 5 is a sectional view of an antenna deploying system employed in the system shown in FIG. 1.

A deploying system 90 for the antenna 20 of the aerial delivery system 10 is shown in FIG. 5. The system 90 includes a housing 92 that is formed from an insulating material and that is mounted in the antenna and sensor housing 16 of the system 10. A conductive post 94 extends into the interior of the housing 92 and is connected to the transmitter circuitry of the system 10 by a lead 96. The post 94 is secured to the antenna 20 by a bolt 98.

During deployment of the system 10, the antenna 20 is retained in the collapsed condition shown in FIG. 5 by a lid 100. The lid 100 is in turn retained by a fusible wire 102. The wire 102 extends between the housing 16 and a terminal 104 that is connected to a lead 106.

After the housing 16 is properly orientated by the orientation correcting system 70 under control of the orientation determining system 50, a current pulse of sufficient magnitude to melt the wire 102 is applied to the lead 106. When the wire 102 is melted, the antenna 20 springs upwardly from the collapsed condition shown in FIG. 5 to the extended condition shown in FIG. 1. During this operation, the antenna 20 coils tightly around the post 94. Thereafter, data recovered by the system 10 is applied to the antenna 20 through the lead 96 and is thereupon transmitted by the antenna.

Figure 6:
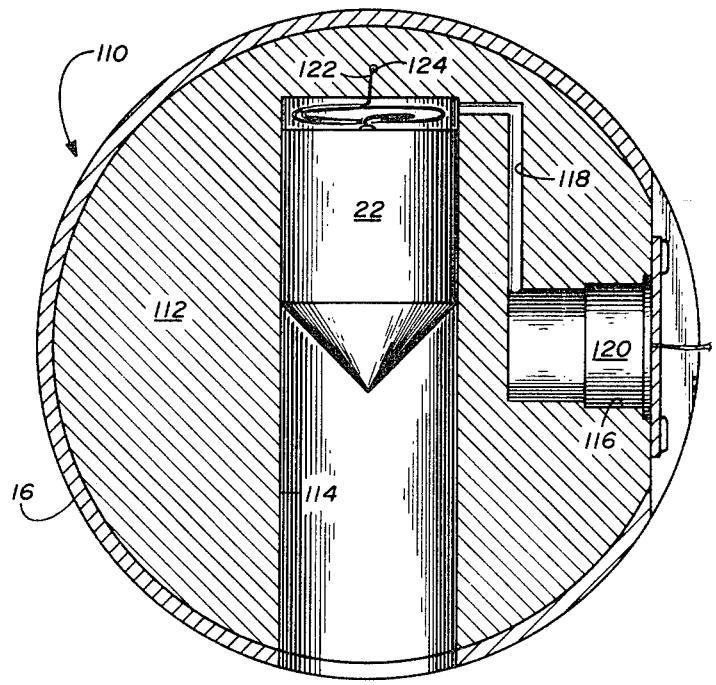
FIG. 6 is a sectional view of a sensor deploying system employed in the system shown in FIG. 1.

The sensor 22 of the aerial delivery system 10 is deployed by the system 110 shown in FIG. 6. The system 110 includes a block 112 which is mounted within the antenna and sensor housing 16 of the system 10 and which has a sensor receiving barrel 114 formed in it. The barrel 114 is connected to a squib receiving cavity 116 by a passageway 118. An electrically operated gas generating squib 120 is mounted in the cavity 116. The sensor 22 is connected to the seismometer circuitry of the system 10 by a pair of leads 122 that extend through a hole 124 formed in the block 112.

During deployment of the system 10, the sensor 22 is mounted in the barrel 114 and is retained by friction.

When the sensor 22 has been oriented by the system 70 under control of the system 50, the squib 120 is fired. The squib 120 produces a gas which enters the barrel 114 and thereupon forces the sensor 22 out of the barrel. Preferably, the gas generated by the squib exerts sufficient pressure on the sensor 22 to force the sensor a considerable distance into the earth. Thereafter, seismic data recovered by the sensor 22 is relayed to the seismometer circuitry of the system 10 through the leads 122.

Figure 7:
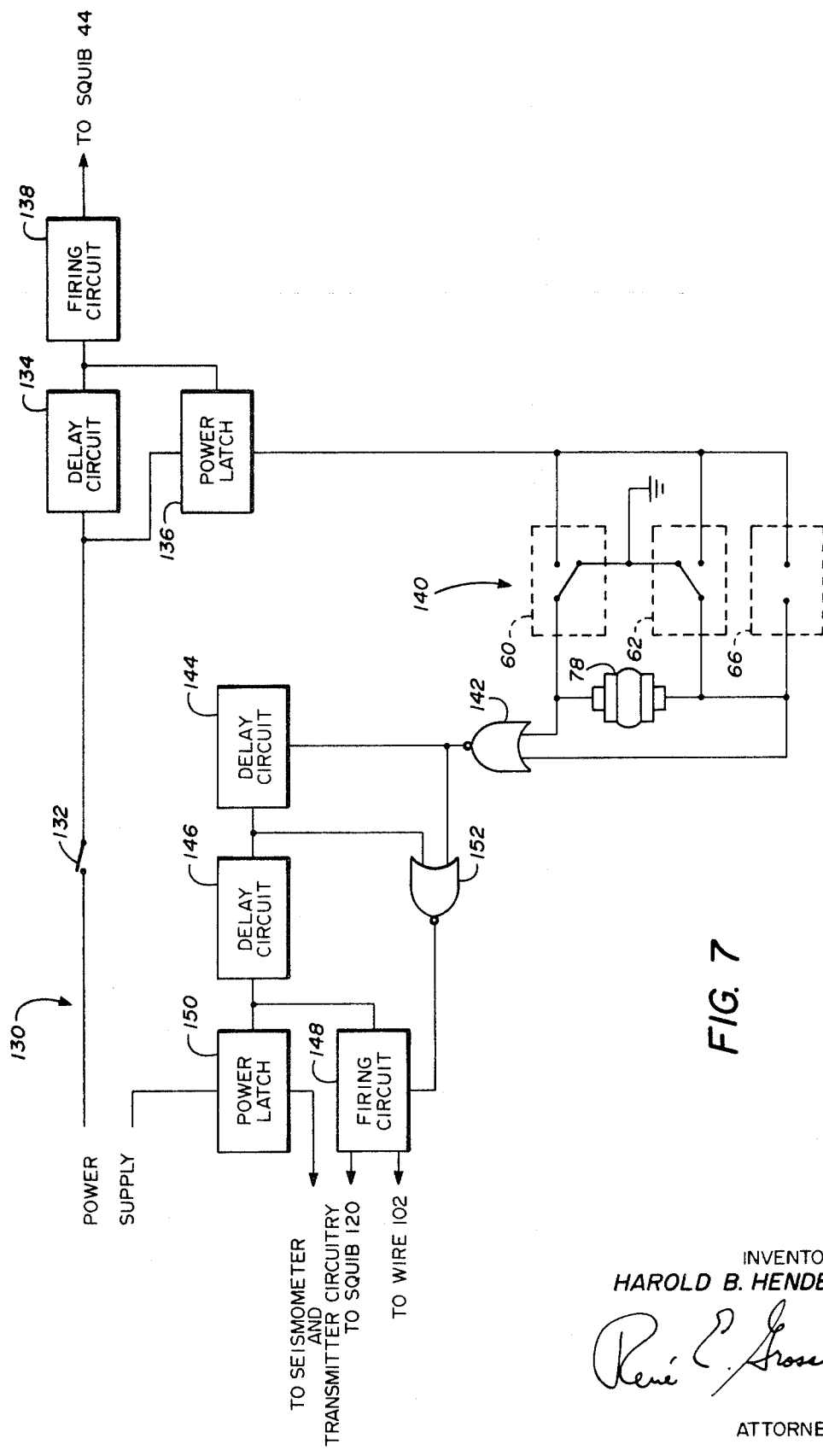
FIG. 7 is a schematic illustration of a circuit useful in the operation of the device shown in FIG. 1.

The operation of the system 10 will be better understood by referring to FIG. 7 wherein a control circuit 130 for the system is schematically illustrated. The circuit 130 includes a switch 132 that connects a first output of a power supply circuit (not shown) to a delay circuit 134 and a power latch 136. The switch 132 initiates operation of circuit 130 and is preferably automatically closed upon release of the system 10 from an aircraft.

The circuit 134 is actuated upon closure of the switch 132. The circuit 134 provides an output at the end of a period of time sufficient to allow the system 110 to come to rest on the earth. The output of the delay circuit 134 initiates the operation of a firing circuit 138 which in turn supplies a firing pulse to the squib 44 (see FIG. 2). The output of the delay circuit 134 also triggers the power latch 136 which, upon actuation, connects the power supply to a motor control circuit 140 on a continuous basis.

The motor control circuit 140 includes the switches 60, 62 and 66 of the orientation determining system 50 and the motor 78 of the orientation correcting system 70 (see FIG. 4). The switches 60 and 62 are connected to opposite terminals of the motor 78 and normally connect their respective terminals to ground. However, when one of the switches 60 and 62 is engaged by the pendulum 52, it connects its terminal to the first output of the power supply. This causes the motor to rotate either clockwise or counterclockwise depending upon whether the switch 60 or the switch 62 is actuated.

The switch 66 operates similarly to the switches 60 and 62 in that it connects a terminal of the motor 78 to the first output of the power supply whenever it is actuated. The switch 66 is connected to the same terminal of the motor 78 as the switch 62 and, accordingly, actuation of the switch 66 causes rotation of the motor in the same direction as actuation of the switch 62. Thus, in the event the pendulum 52 is upside down, the switch 66 initiates rotation of the housing 16 in a certain direction. As soon as the housing 16 begins to rotate, the pendulum 52 engages the switch 62 which thereafter continues rotation of the housing 16 in the same direction.

A Nor-gate 142 is coupled in parallel with the motor 78. Whenever the outputs of both the switch 60 and the switch 62 are at ground, the gate 142 produces an output which initiates the operation of a delay circuit 144. The circuit 144 produces an output pulse a first predetermined period of time after it is actuated.

The output of the delay circuit 144 actuates a delay circuit 146. The circuit 146 is connected to a firing circuit 148 and to a power latch 150. Therefore, when a second predetermined period of time has elapsed after the actuation of the circuit 146, an output pulse is directed from the circuit 146 to the firing circuit 148 and to the power latch 150.

The firing circuit 148 has a pair of outputs, one of which extends the squib 120 and the other which extends to the wire 102. Upon actuation, the firing circuit generates a current pulse that actuates the squib 120 and melts the wire 102 (shown in FIG. 5). The power latch 150 interconnects a second output of the power supply and the transmitter and seismometer circuitry of the system 10. Once triggered by the output of the circuit 146, the power latch 150 connects the power supply to the transmitter and the seismometer circuitry of the system 10 on a continuous basis. Accordingly, the output of the circuit 146 causes the deployment of the antenna 22 and the sensor 20 of the system 10 and initiates the operation of the data recovery circuitry of the system 10.

The circuit 130 further includes a Nor-gate 152. The gate 152 has a pair of inputs that are coupled to the outputs of the Nor-gate 142 and the delay circuit 144 and has a single output that is coupled to the firing circuit 148. The Nor-gate 152 functions to inhibit the operation of the firing circuit 148 in response to spurious outputs from the motor 178, the switches 60, 62 and 66, etc. The gate 152 produces an inhibit output whenever the gate 142 and the circuit 144 do not produce simultaneous outputs. Thus, the gate 152 prevents the actuation of the firing circuit 148 until the switches 60 and 62 have remained at ground for the first predetermined period of time.

It should be understood that the various components comprising the circuit 130 are conventional in nature and that various standard subcircuits may be employed in the practice of the invention. For example, the delay circuits 134, 144 and 146 may comprise any circuit that produces an output a predetermined time after it receives an input, such as a conventional monostable multi-vibrator circuit. Similarly, the power latches 136 and 150 may comprise any circuit or device that responds to a trigger pulse to couple an input to an output. For example, conventional self-latching relays or conventional silicon controlled rectifiers may be employed as power latches in the circuit 130.

The firing circuits 138 and 148 of the circuit 130 may comprise any of the various circuits that respond to an input pulse to produce an output current of sufficient magnitude and duration to fire the squibs 44 and 120 and to melt the wire 102. For example, conventional monostable multi-vibrator firing circuits may be employed in the circuit 130. Finally, the Nor-gates 142 and 152 of the circuit may comprise any of the commercially available Nor-gate logic circuits and may comprise other logic elements provided certain rearrangements are made in the circuit 130.

It will be understood that aerial delivery systems employing the present invention can be used to deploy numerous data recovery systems in addition to seismic systems. In such cases, it is often unnecessary to deploy both a sensor and an antenna. That is, the deployment of a single data recovery instrumentality is often sufficient. Furthermore, when the invention is used to deploy systems other than seismic systems, the orientation of a data recovery instrumentality with respect to a physical phenomenon other than gravity is often required. For example, it is frequently necessary to orient an antenna, a sensor, etc. relative to the earth's magnetic field, relative to light, etc.

The various components of the system 10 may be interchanged with other components which accomplish the same or similar functions. For example, the feet can be extended by springs, if desired. Likewise, the portions of the container can be rotated relative to each other by a pawl and ratchet mechanism, or they can be spring loaded and controlled by mechanisms that initiate rotation under the power of the spring and subsequently check the rotation after a desired amount of rotation has taken place. Furthermore, the antenna of the system need not be deployed in the manner shown and may comprise any suitable antenna structure deployed in any suitable manner.

The aerial delivery system illustrated in the drawing has several advantages over prior systems. For example, since the system does not employ fins or other projections during its deployment, it may be used in wooded areas without danger of its becoming lodged in trees. The effectiveness of the system is not dependant upon the speed or direction of its fall and, accordingly, even if the system is deflected during the last few feet of its travel its operation is not hindered. Finally, since the system need not be oriented in any particular direction during its fall, it can be employed in airless applications, such as the moon, provided it is adapted to withstand the forces encountered in such an application.

Although only one embodiment of the invention is illustrated in the drawings and described herein, it will be understood that the invention is not limited to the embodiment disclosed but is capable of rearrangement, modification, and substitution of parts and elements without departing from the spirit of the invention.

What is claimed is:

1. An air-to-surface delivery system comprising:
   a. a cylinder including a first housing and a second housing,
   b. means in said first housing for stabilizing said first housing to the surface,
   c. a data recovery instrumentality included within said second housing,
   d. orientation means for determining the orientation of said instrumentality as to the earth's gravitational field including a pendulum pivotally interconnected to said instrumentality, and
   e. means for orienting the instrumentality relative to the earth's gravitational force.

2. A container suitable for air delivery comprising:
   a. a container having a first and second housing,
   b. a container stabilizing means carried by the first housing for stabilizing the container as to the supporting medium,
   c. means for determining the orientation of the stabilized container, and
   d. means for rotating the second housing relative to the stabilized first housing.

3. A container suitable for air delivery according to claim 2 wherein the means for determining the orientation of the stabilized container includes a predetermined reference.

4. A container suitable for air delivery according to claim 3 further including a data recovery instrumentality included in said second housing.

5. A container suitable for air delivery according to claim 4 wherein a pendulum pivotally interconnected to said instrumentality is included in the means for determining the orientation of the instrumentality.

6. A container suitable for air delivery according to claim 5, wherein said means for orienting includes motor and gearing means for rotating said second housing relative to said first housing.

7. A container suitable for air delivery according to claim 6 further including switching means responsive to the position of said pendulum which causes engagement of the motor and gearing means to properly orient said instrumentality.

8. A container suitable for air delivery according to claim 2, wherein the container stabilizing means includes a pair of extendable stabilizing feet deployable responsive to a signal.

9. A container suitable for air delivery according to claim 4, wherein the data recovery instrumentality includes a collapsible antenna deployed from said second housing responsive to a signal.

10. A container suitable for air delivery according to claim 9, further including a seismic sensor deployable from said second housing responsive to a signal.

11. A container suitable for air delivery according to claim 4, further including a control circuit operative responsive to a source of power to sequentially deploy the stabilizing means of the first housing after contact with the supporting medium, actuate the means for rotating the second housing relative to the stabilized first housing, and to actuate the data recovery instrumentality.

12. A container suitable for air dilivery according to claim 1 wherein said means for orienting includes motor and gearing means for rotating said second housing relative to said first housing.

13. A container suitable for air delivery according to claim 12 further including switching means responsive to the position of said pendulum which causes engagement of the motor and gearing means to properly orient said instrumentality.

* * * * *